Patented Feb. 20, 1951

2,542,070

UNITED STATES PATENT OFFICE 2,542,070

SOLUTIONS OF POLYMERIC CHLORO-TRIFLUOROETHYLENE

Murray M. Sprung and Frederick O. Guenther, Schenectady, N. Y., assignors to General Electric Company, a corporation of New York No Drawing. Application November 25, 1949, Serial No. 129,533

10 Claims. (Cl. 260—33.6)

This invention is concerned with solutions of polymeric chlorotrifluoroethylene. More particularly, the invention relates to a solution comprising (1) polymeric chlorotrifluoroethylene dissolved in (2) an aromatic hydrocarbon selected from the class consisting of pseudocumene, mesitylene, tertiary-butylbenzene, p-tertiary-butyltoluene, beta - methylnaphthalene, alpha, beta-dimethylnaphthalene, amylbiphenyl, alpha-methyl, para-methylstyrene, para-cymene, distyrene (styrene dimer), diamylbiphenyl, para-ditertiary butylbenzene, mixtures of alkylated benzenes obtained in the distillation of coal tar fractions and in the cracking or hydroforming of select petroleum fractions, as well as mixtures of the foregoing solvents.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance, high flow point, and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene, but these have generally been unsuccessful because the limit of solubility of the polymeric chlorotrifluoroethylene in the solvent has been so small as to render it impractical.

We have now discovered that we are able to make solutions of polymeric chlorotrifluoroethylene (any solid polymer thereof) whereby it is possible to obtain concentrations of the latter polymer in the solution in sufficiently large amounts as to make them useful in many coating and impregnating applications. By means of our invention, it is possible to obtain solutions containing at least 10 per cent, by weight, solids of the polymeric chlorotrifluoroethylene, whereas formerly the solubility of the polymer in other solvents was negligible.

In addition to the advantages described above for our invention, we have also found that such solutions are accompanied by still further advantages. Among these are the ability to deposit more uniform and more homogeneous coatings on such materials as electrical conductors, particularly magnet wire. In addition, these hot solutions have a definite advantage over the use of some suspensions of polymeric chlorotrifluoroethylene since, by means of application of a polymer from hot solutions, the deposited film is continuous and requires no fusion at elevated temperatures to cause coalescence of the individual particles in the coating. When employing suspensions or dispersions, high temperatures are necessary to cause fusion of the individual particles which, although closely packed together, are nevertheless not continuous. Also, when applying coatings on magnet wire by means of the above-described solutions, conventional magnet wire dies can be used, permitting a more uniform build-up of film thickness. Finally, because of the lower temperatures at which coating of various materials can be effected, thermal effects on the polymer are minimized.

In accordance with our invention, we prepare a mixture of finely divided polymeric chlorotrifluoroethylene and the aromatic hydrocarbon and heat the mixture at a temperature sufficiently high to cause the polymer to dissolve in the solvent. Generally, we have found that solution in the particular class of solvents employed herein takes place at temperatures of the order of from about 135° to 300° C. By maintaining these solutions at the temperatures at which solution of the polymer has taken place, we are able to employ the solutions in the same manner as solutions of other better known polymers. If the temperature is allowed to drop much below the solution temperature, small amounts of the polymer will begin to settle out while larger amounts will begin to precipitate as the temperature of the solution drops still further. Despite this, however, this is believed to be the first time that it has been possible to obtain solutions of such relatively high concentrations of the high polymeric chlorotrifluoroethylene even at elevated temperatures.

Among the aromatic hydrocarbons which we have found to be suitable in the practice of our invention are pseudocumene (1,2,4-trimethylbenzene), mesitylene (1,3,5-trimethyl benzene), p-tertiary - butyltoluene, tertiary butylbenzene, alpha-methylstyrene, para-cymene, methylnaphthalene, dimethylnaphthalene, amylbiphenyl, diamylbiphenyl, para-ditertiary-butylbenzene, styrene, dimer, etc.

Among the mixtures of liquid, organic alkylated aromatic hydrocarbons which we may use are those obtained, for instance, (1) by the cracking and distillation of the volatile portions of coal tar and (2) mixtures of alkylated aromatic hydrocarbons obtained by the cracking and hydroforming and subsequent distillation of light petroleum oils, etc. An example of a mixture of alkylated aromatic hydrocarbons obtained from coal tar comprises materials called "Hi-Flash" naphtha (also called "High Flash" naphtha) whose boiling range may be from 135° C. to 195° C. or somewhat higher depending upon the cut taken during distillation. Thus, one such fraction may have a boiling range of 140° C. to 180° C., while another fraction may boil from about 150° C. to 175° C. A typical analysis of Hi-Flash naphtha comprises the following ingredients in stipulated per cents, by weight:

| | Per cent |
|---|---|
| Ethylbenzene, xylene, cumene, propylbenzene, ethyltoluene | 10 |
| Trimethylbenzene (e. g., mesitylene) | 45 |
| Tetramethylbenzene | 40 |
| Naphthalene | 5 |

Examples of materials coming from the distillation of light petroleum oils comprises liquids identified as Solvessos which have boiling point ranges somewhere between approximately 94° C. to 240° C., and solvent naphtha which is a narrow cut boiling between about 135° C. to 155° C. Description of the above-described mixtures of liquid alkylated aromatic hydrocarbons may be found in the book "Industrial Solvents" by Ibert Mellan, published by Reinhold Publishing Corp. (1939) and the book "Protective and Decorative Coatings" edited by Joseph J. Mattiello, chapter 14B, page 180 and published by U. S. Printing Office (1945).

It was entirely unexpected and in no way could have been predicted that these particular aromatic hydrocarbons were effective solvents for polymeric chlorotrifluoroethylene since similar solvents such as, cumene, 1,2,3-trimethylbenzene, ethylbenzene, n-butylbenzene, diethylbenzene, etc., were entirely ineffective as solvents for the polymer.

The advantage of the aforementioned solvents in combination with the polymeric chlorotrifluoroethylene for making solutions lies in the fact that it is possible to obtain solutions of the polymer at relatively low temperatures. Because of this there is scarcely any change in the properties of the polymer due to high temperatures as quite frequently occurs when solvents having a relatively high solution temperature are employed for making the solutions of the polymer. Moreover, because the aromatic hydrocarbons mentioned above do not become peroxidized readily, oxidative effects on the polymer are minimized.

In order that those skilled in the art may better understand how the present invention may be practiced, the following example is given by way of illustration and not by way of limitation.

EXAMPLE 1

This example illustrates the preparation of solutions of polymeric chlorotrifluoroethylene using the various solvents recited previously. In each case, 10 per cent, by weight, polymer and 90 per cent, by weight, solvent were employed so that there was obtained a ten per cent solution of the polymer in the particular solvent. After mixing the polymeric chlorotrifluoroethylene (no strength temperature 245° C.) with the particular solvent involved, the mixture was heated until solution thereof took place. The temperatures at which solution took place are noted in the table below.

Table 1

| Compound | For 10% Solution, Solution Temp., °C. |
|---|---|
| 1, 2, 4-trimethylbenzene | 170 |
| 1, 3, 5-trimethylbenzene | 136–140 |
| beta-methylnaphthalene | 240 |
| dimethylnaphthalene | 250–260 |
| isoamylnaphthalene | 280 |
| alpha-methyl, para-methylstyrene | 177 |
| para-cymene | 176 |
| tertiary-butylbenzene | 167 |
| distyrene (dimer) | 265–275 |
| para-tertiary-butyltoluene | 168 |
| para-di-tertiary butylbenzene | 212 |
| amylbiphenyl | 260–280 |
| diamylbiphenyl | 300 |
| Hi-flash naphtha (boiling point range about 140°–190° C.) [1] | 165 |
| Solvesso 100 (boiling point range about 150°–180° C.) [2] | 155 |
| Solvesso 150 (boiling point range about 180°–215° C.) [2] | 170 |

[1] A neutral coal tar distillate having a boiling range between 130–210° C. and comprising a mixture of alkylated benzenes, e. g., xylenes, trimethyl benzenes, tetramethyl benzenes, and methyl ethyl benzenes.
[2] Mixture of aromatic hydrocarbons comprising xylene, trimethyl benzene, tetramethyl benzene, and closely related alkylated benzenes obtained by cracking and hydroforming of select petroleum oil fractions.

Although the foregoing examples are all concerned with making solutions having a concentration of ten per cent, by weight, of the polymeric chlorotrifluoroethylene, it will, of course, be apparent to those skilled in the art that lower or higher concentrations of the polymer may also be employed. Thus, I may prepare solutions varying in concentrations from about one to twenty per cent, by weight, of the polymer based on the total weight of the solution. In such cases where lower concentrations of the polymer are desired, it will be found that somewhat lower temperatures of solution will be encountered while the converse, that is, somewhat higher temperatures of solution may be needed when the concentration of the polymer rises substantially above ten per cent.

In addition to the requirement for higher solution temperatures where concentrations greater than ten per cent of polymer are desired, it will also be noted that the viscosity of the solution will begin to increase materially. However, in many instances this disadvantage can be cured by raising the temperature of the solution (if the solvent permits this) to a point where a satisfactory viscosity is attained. All these factors which have been mentioned above can be balanced to give solutions of polymeric chlorotrifluoroethylene which have satisfactory concentration of polymer, viscosity, and operating temperature range.

The claimed solutions have utility in many applications and may be employed in various ways. They may be used to coat and impregnate various fillers, such as, for example, glass cloth, glass batting, asbestos cloth or asbestos floats, mica, etc. In addition, the solutions are advantageously employed for coating electrical conductors to give heat resistant and chemical resistant insulations for such conductors. If desired, molding compositions may be advantageously prepared by adding various inorganic fillers to obtain a homogeneous mixture and thereafter removing the solvent from the mixture. Laminated products may also be prepared by coating and impregnating sheet material with the solutions and superposing layers of the impregnated and coated material and pressing the total assembly under heat and pressure (after the solvent has been removed from the treated sheet material), thereby to cause fusing of the polymer and to give a homogeneous article.

What we claim as new and desire to secure by Letters Patent of the United States is:

1. A solution comprising (1) a solute phase comprising polymeric chlorotrifluoroethylene dissolved in (2) a solvent phase comprising an aromatic hydrocarbon selected from the class consisting of pseudocumene, mesitylene, tertiary-butylbenzene, p - tertiary - butyltoluene, beta-methylnaphthalene, alpha,beta-dimethyl naphthalene, amylbiphenyl, alpha - methyl - para-methylstyrene, para-cymene, distyrene, diamylbiphenyl, para-ditertiary-butylbenzene, mixtures of alkylated benzenes obtained from coal tar distillates and from select petroleum fractions, and mixtures of the foregoing ingredients.

2. A solution comprising (1) a solute phase comprising polymeric chlorotrifluoroethylene dissolved in (2) a solvent phase comprising mesitylene.

3. A solution comprising (1) a solute phase comprising polymeric chlorotrifluoroethylene dissolved in (2) a solvent phase comprising para-tertiary-butyltoluene.

4. A solution comprising (1) a solute phase comprising polymeric chlorotrifluoroethylene dissolved in (2) a mixture of aromatic hydrocarbons comprising xylenes, methyl ethyl benzenes, trimethyl benzenes and tetramethyl benzenes.

5. A solution comprising (1) a solute phase comprising polymeric chlorotrifluoroethylene dissolved in (2) tertiary-butyl-benzene.

6. A solution comprising (1) a solute phase comprising polymeric chlorotrifluoroethylene dissolved in (2) an organic liquid comprising a mixture of alkylated benzenes obtained by the hydroforming and distillation of select petroleum oil fractions and having a boiling point range of from about 150° to 215° C.

7. The method of preparing a solution of polymeric chlorotrifluoroethylene containing at least one per cent, by weight, of the polymer, which method comprises (1) forming a mixture of ingredients comprising (a) finely divided polymeric chlorotrifluoroethylene and (b) an aromatic hydrocarbon selected from the class consisting of pseudocumene, mesitylene, tertiary-butylbenzene, p - tertiary - butlytoluene, beta - methylnaphthalene, alpha,beta-dimethylnaphthalene, amylbiphenyl, alpha - methyl, para - methylstyrene, para-cymene, distyrene, diamylbiphenyl, para-ditertiary-butylbenzene, mixtures of alkylated benzenes obtained from coal tar distillates and from select petroleum fractions, and mixtures of the foregoing ingredients, and (2) heating the mixture of ingredients at an elevated temperature sufficient to dissolve the polymer and to form a homogeneous solution.

8. The method of forming a solution of polymeric chlorotrifluoroethylene containing at least one per cent, by weight, of the polymer, which method comprises (1) forming a mixture of ingredients comprising (a) finely divided polymeric chlorotrifluoroethylene and (b) mesitylene, and (2) heating the mixture of ingredients at an elevated temperature sufficient to dissolve the polymer and form a homogeneous solution.

9. The method of forming a solution of polymeric chlorotrifluoroethylene containing at least one per cent, by weight, of the polymer, which method comprises (1) forming a mixture of ingredients comprising (a) finely divided polymeric chlorotrifluoroethylene and (b) p-tertiary-butylbenzene, and (2) heating the mixture of ingredients at an elevated temperature sufficient to dissolve the polymer and form a homogeneous solution.

10. The method of forming a solution of polymeric chlorotrifluoroethylene containing at least one per cent, by weight, of the polymer, which method comprises (1) forming a mixture of ingredients comprising (a) finely divided polymeric chlorotrifluoroethylene and (b) a mixture of aromatic hydrocarbons comprising xylenes, methyl ethyl benzenes, trimethyl benzenes and tetramethyl benzenes, and (2) heating the mixture of ingredients at an elevated temperature sufficient to dissolve the polymer and form a homogeneous solution.

MURRAY M. SPRUNG.
FREDERICK O. GUENTHER.

No references cited.